United States Patent [19]

Björshol

[11] Patent Number: 4,566,215
[45] Date of Patent: Jan. 28, 1986

[54] APPARATUS FOR THE RELEASE OF A FISH HOOK FROM A SNOOD HEAD

[76] Inventor: Kolbjörn Björshol, N-6560, Langøyneset, Norway

[21] Appl. No.: 598,328
[22] PCT Filed: Aug. 1, 1983
[86] PCT No.: PCT/No83/00030
§ 371 Date: Mar. 27, 1984
§ 102(e) Date: Mar. 27, 1984
[87] PCT Pub. No.: WO84/00469
PCT Pub. Date: Feb. 16, 1984

[30] Foreign Application Priority Data

Aug. 3, 1982 [NO] Norway ................................. 822650

[51] Int. Cl.⁴ ...................... A01K 83/00; A01K 91/04
[52] U.S. Cl. ......................................... 43/4; 43/44.83; 43/44.92
[58] Field of Search ................ 43/4, 4.5, 44.86, 44.83, 43/43.1, 43.12, 43.16, 44.92; 29/426.6

[56] References Cited

U.S. PATENT DOCUMENTS

| | | | |
|---|---|---|---|
| 1,457,550 | 6/1923 | Runkel | 43/44.86 |
| 4,030,225 | 6/1977 | Earley | 43/44.83 |
| 4,068,399 | 1/1978 | Björshol | 43/26.1 |
| 4,205,479 | 6/1980 | Björshol | 43/44.92 |
| 4,277,905 | 7/1981 | Huse | 43/44.83 |

Primary Examiner—Gene P. Crosby
Attorney, Agent, or Firm—Watson, Cole, Grindle & Watson

[57] ABSTRACT

An apparatus for releasing a fish hook from an elongated snood head which has a transversely-extending opening and a U-shaped leaf spring which has projections which extend outwardly therefrom and branches which are spreadable to release the leg of the fish hook. The apparatus including a housing which is movably mounted on a slide guide, the housing including a longitudinal cavity in which the elongated snood head is positionable and a conical entry portion, a plurality of wire guides which obliquely extend towards the longitudinal cavity and which have inner ends that extend into the longitudinal cavity to cooperate with the projections of the U-shaped leaf spring. A cock is pivotally connected to the housing, the cock having a slotted point which extends into the longitudinal cavity and a caster, and a stationary cam along which the caster of the cock moves. Pivotal movement of the cock with respect to the housing due to the caster thereof moving over the stationary cam being capable of moving the elongated snood head relative to the inner ends of the wire guides, such that the inner ends of the wire guides will contact the projections of the U-shaped leaf spring, thus causing the branches of the U-shaped leaf spring to spread and the fish hook to be released therefrom.

3 Claims, 9 Drawing Figures

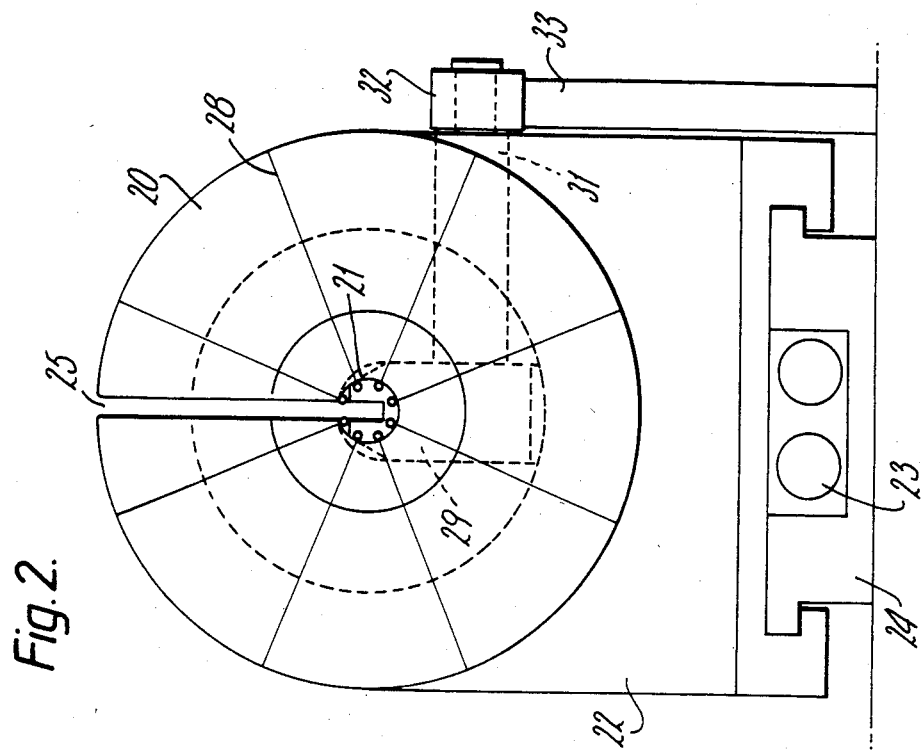
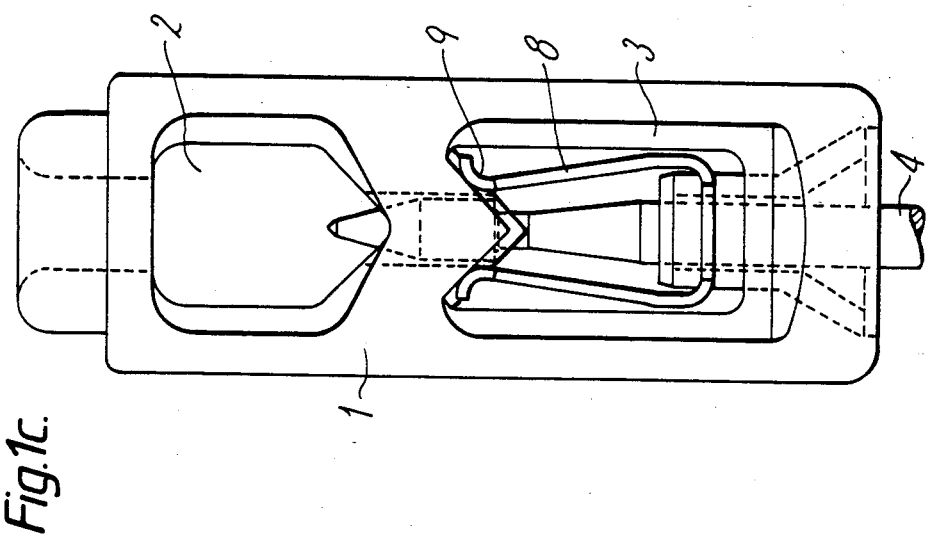
Fig.2.
Fig.1c.

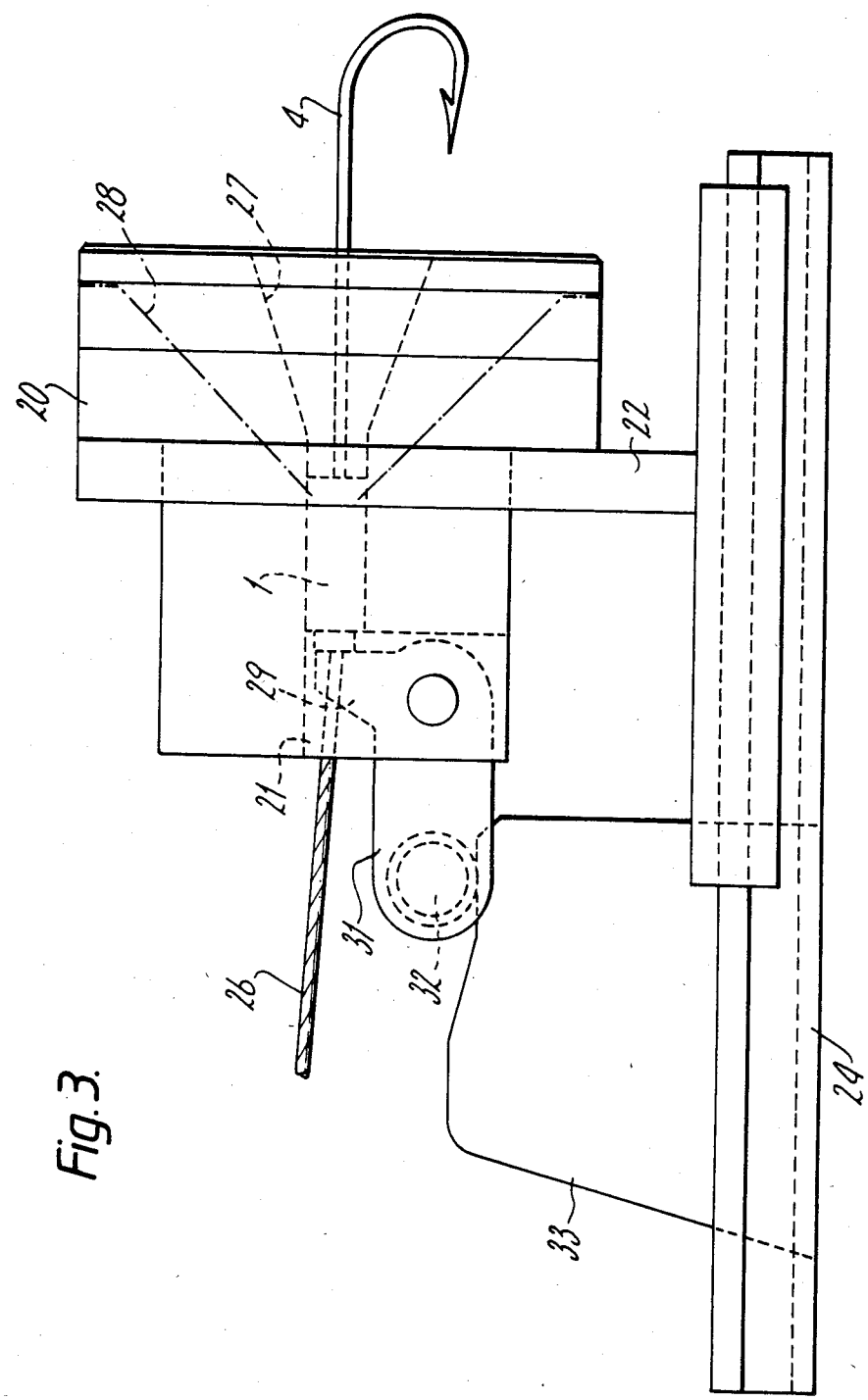

APPARATUS FOR THE RELEASE OF A FISH HOOK FROM A SNOOD HEAD

BACKGROUND OF THE INVENTION

The present invention relates to an apparatus for the release of a fish hook which is connected to its snood through a head of the type which in a transversely-extending opening receives a substantially U-shaped lead spring which is movable in the opening in the longitudinal direction of the head and the branches of which are adapted to cooperate with an annular face on the leg of a fish hook and, in part, to be spread when each cooperates with an oblique surface in the opening for the purpose of releasing the engagement between the hook leg and the leaf spring. For the movement of the leaf spring in the longitudinal direction of the head for the purpose of spreading the leaf spring branches so that the fish hook leg be released from engagement with the leaf spring branches, the part of the spring which interconnects the two branches is provided with projections which may be activated from the outside.

The object of the invention is to provide an apparatus which in a simple and secure manner may be caused to perform the noted external activation of the leaf spring relative to the head proper.

SUMMARY OF THE INVENTION

According to the invention, the apparatus comprises a housing having a longitudinal cavity with a cross section which corresponds to the cross section of a snood head and having a conical entry portion wherein a number of radial and oblique wire springs are arranged, the ends of the wire springs extending into the cavity, as well as a cock which may extend into the cavity, is pivotably mounted in the housing and is provided with a caster adapted to cooperate with a stationary cam during movements of the housing in the longitudinal direction of the cavity. In such an apparatus the movement of the leaf spring relatively to the associated oblique faces required for the release of the hook leg, be obtained by displacement of the snood head relatively to the apparatus housing under the control of the engagement between the caster and the cam. Further features of the apparatus according to the invention will appear from the following description, with reference to the accompanying drawings.

DESCRIPTION OF THE DRAWINGS

FIGS. 1a, 1b and 1c show side views of a snood head adapted for treatment in an apparatus according to the invention, FIGS. 1a and 1b being views of the head as seen in mutually perpendicular directions with a hook leg in locked position, and FIG. 1c being a view similar to that of FIG. 1a with the leaf spring in position for release of the hook leg.

FIG. 2 is an end view of the apparatus according to the invention, as seen in the direction of the axis of the longitudinal cavity.

FIG. 3 is a side view as seen at right angles to the longitudinal cavity.

DETAILED DESCRIPTION OF THE PREFERRED EMBODIMENT

Figure 1A:
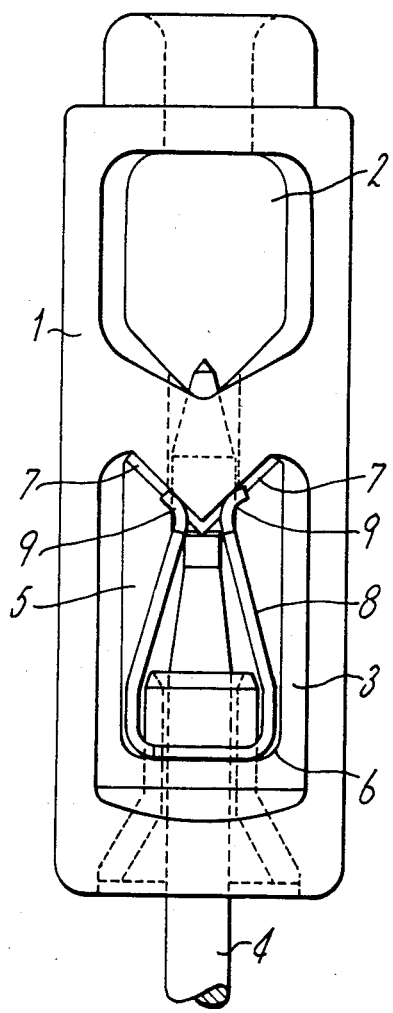
Figure 1B:
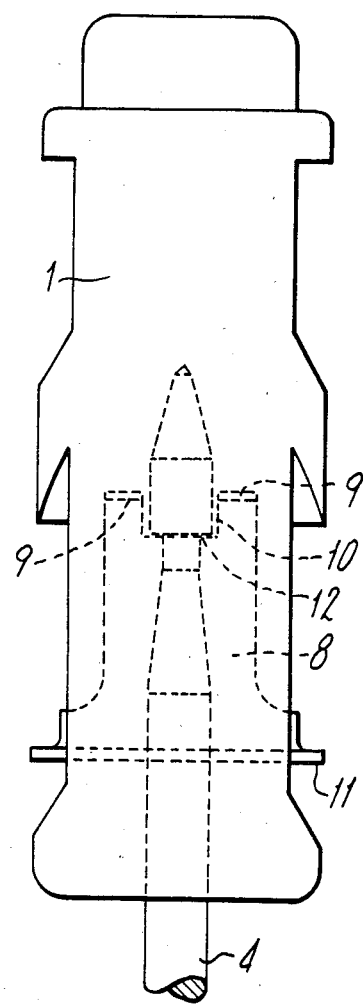

A snood head which is particularly suited for treatment in an apparatus according to the invention is illustrated in FIGS. 1a, 1b and 1c. It consists in an elongated member 1 which is preferably made of plastic material and was a circular or rectangular cross section. At one end the elongated member is provided with an eye 2 adapted to receive and secure a snood and at its other end it is provided with a longitudinal cavity 3 which is adapted for introduction, receiving and removal of the leg 4 of a fish hook. Along the length of the cavity 3 it is extended to a transverse opening 5 which at the end facing the introduction end of the cavity 3 presents a plane surface 6 and in the opposite direction presents two oblique surfaces 7. Each of the surfaces 7 is in the transverse direction split in two, such that the cavity 3 is extended so as to form a projection. In the transverse opening 5 and an approximately U-shaped leaf spring 8 is locked, the bottom portion of which is provided with an apperature corresponding to the cavity 3 and engages the surface 6, while each of the free ends 9 of the spring is provided with a depression 10 corresponding to the projection referred to, each of the branches being bent for engagement with its proper oblique surface 7.

The bottom portion of the leaf spring 8 is made with projections 11 which extend outwardly to the circumference of the housing 5, so that the spring may be displaced longitudinally of the housing by activation of the projections 11.

This snood head is intended for cooperation with a fish hook, the leg of which is made with a thin portion so as to form an annular surface 12 extending perpendicularly to the direction of the leg 4. This surface is engageable with the bottom of each of the depressions 10 in the leaf spring ends 9 so that the hook leg be secured when introduced through the cavity 3.

When the hook leg is to be released from the head 1, the leaf spring 8 is moved forwardly by means of the projections 11, so that each of the bended ends 9 of the leaf spring 8 engages its proper oblique surface 7, whereby the spring ends are spread and the depressions 10 disengage the annular surface 12 and the hook leg 4 may be withdrawn from the head.

A snood head as described above and illustrated in FIGS. 1a, 1b and 1c forms no part of the present invention, which relates to an apparatus for actuation of the projections 11 for the release of the connection between the snood head 1 and a fish hook leg 4.

Such an apparatus and the operation of the same will appear from the following description with reference to the FIGS. 2 to 7.

As shown in the drawings, the apparatus comprises a housing 20 which is made with a longitudinally-extending cavity 21 with a cross section which corresponds to the circumference of a snood head 1. The housing 20 is supported by a foot 22 which constitutes one part of a slide guide, the foot 22 being subjected to the influence of springs 23 which tend to carry the foot 22 with the housing to the right in FIG. 3 along the slide guide 24. The housing is made with a radial slot 25 outwardly from the cavity 21, so that a snood head 1 with its snood 26 may be entered into the cavity 21 with a fish hook 4 introduced in the head 1.

The cavity ends at the entry side in a conical surface 27 for the purpose of facilitating the introduction of the snood head. Further, a number of wire springs 28 are arranged to extend obliquely inwardly towards the cavity 21 and project into the same, so that they, with their inner ends 281 may engage projections 11 on the U-shaped leaf spring 8 in a snood head 1 when this is introduced into the cavity 21 in the apparatus. The number of wire springs 28 is so great that engagement between at least two springs 28 and the projections 11 is always obtained, independently of the orientation of the head 1 in the cavity 21.

A cock 29 is also arranged in the housing 20, the point 30 of the cock extending radially into the cavity 21. The point 30 is slotted in correspondence with the slot 25 so as to pass a snood 26. The cock 29 is provided with a tail 31 at the end of which a caster 322 is supported, the caster being adapted to cooperate with a stationary cam 33, the profile of which decides the angular position of the cock 29.

With reference to the FIGS. 3 to 7, the functioning of the apparatus will now be described.

Figure 4:
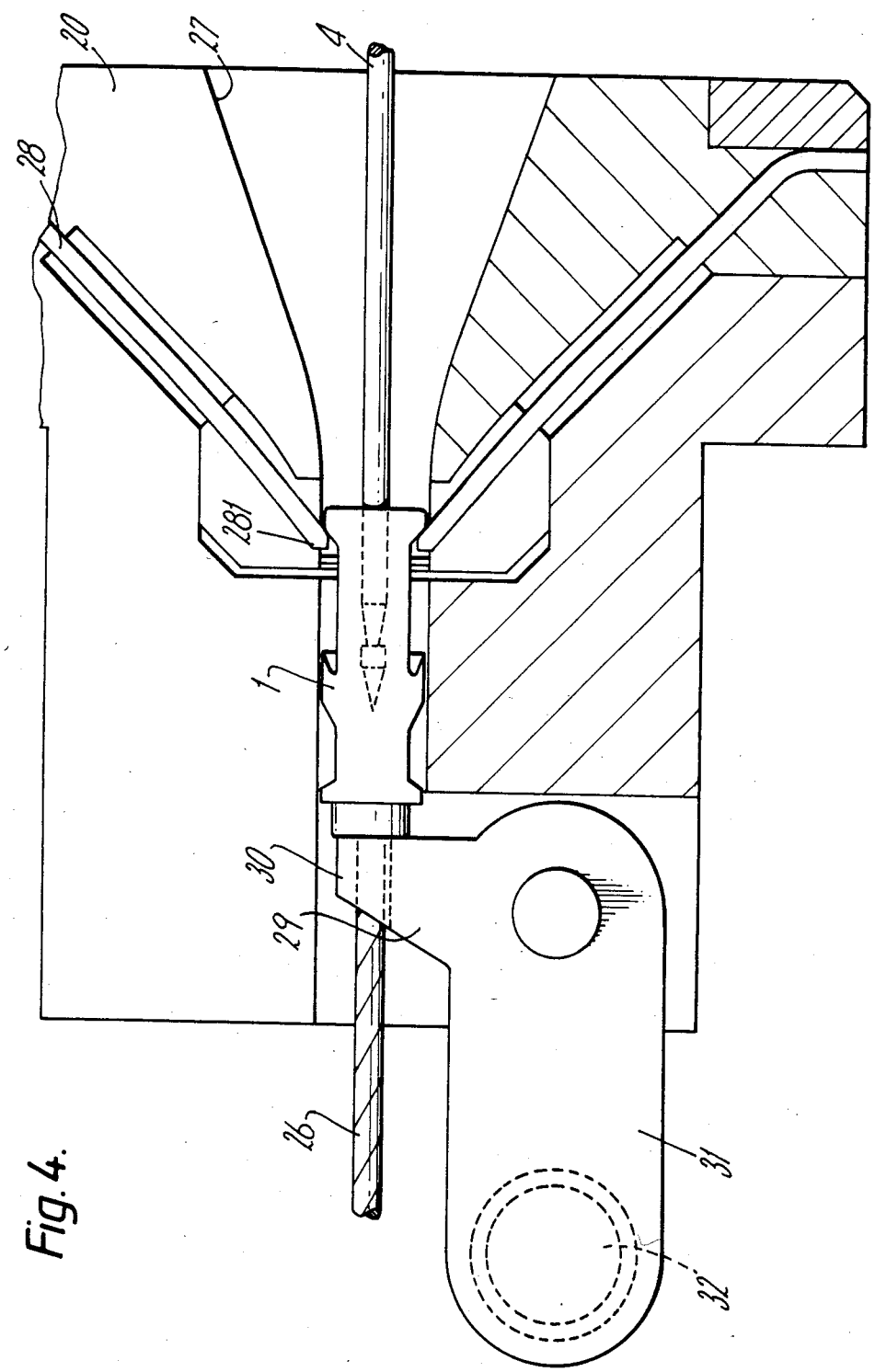
FIG. 4 is a side view, at a larger scale than those of FIGS. 2 and 3 of the apparatus, partly in section through the longitudinal cavity.
Figure 5:
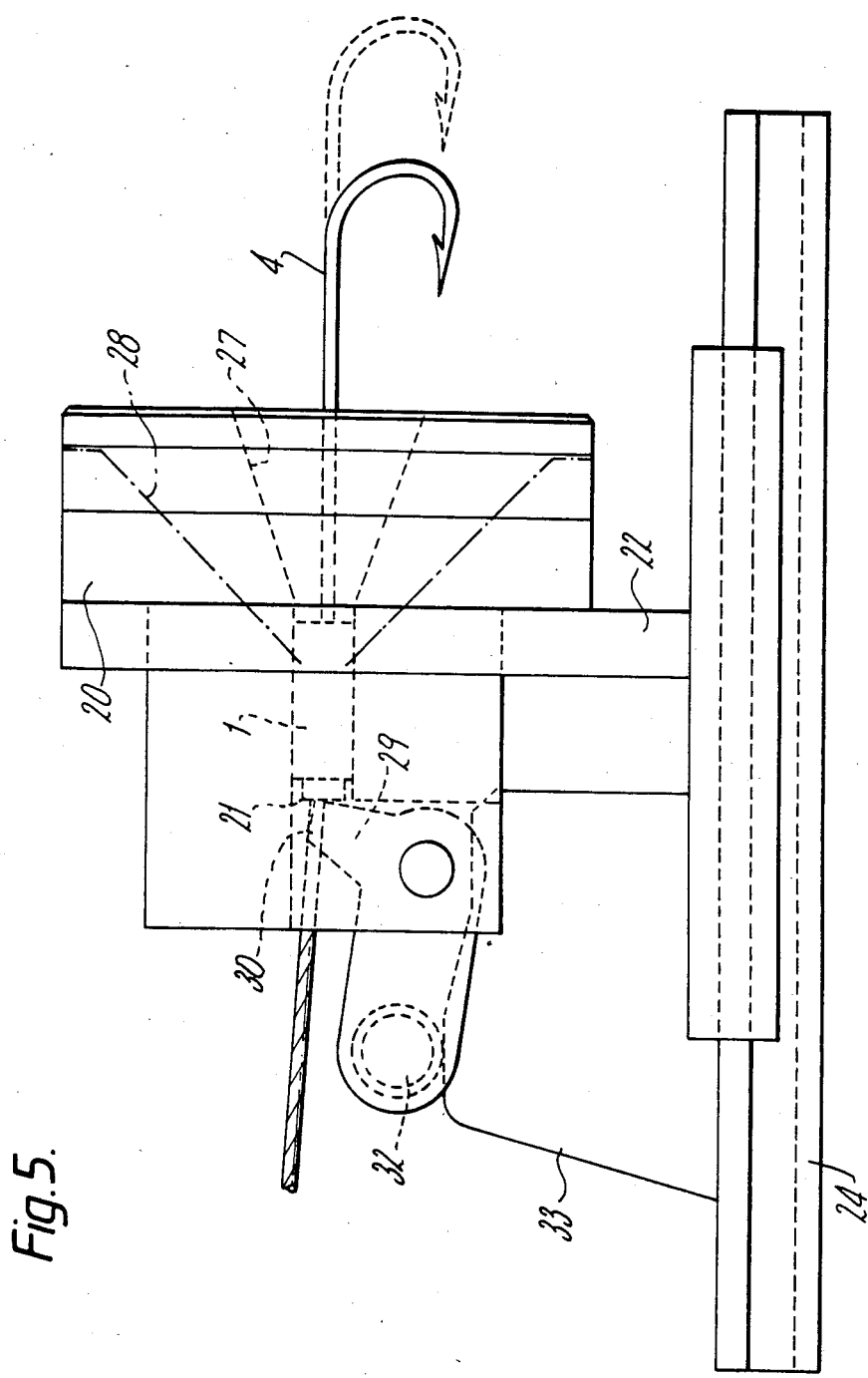
FIG. 5 is a side view corresponding to that of FIG. 3, at a later time during the release of the hook.
Figure 6:
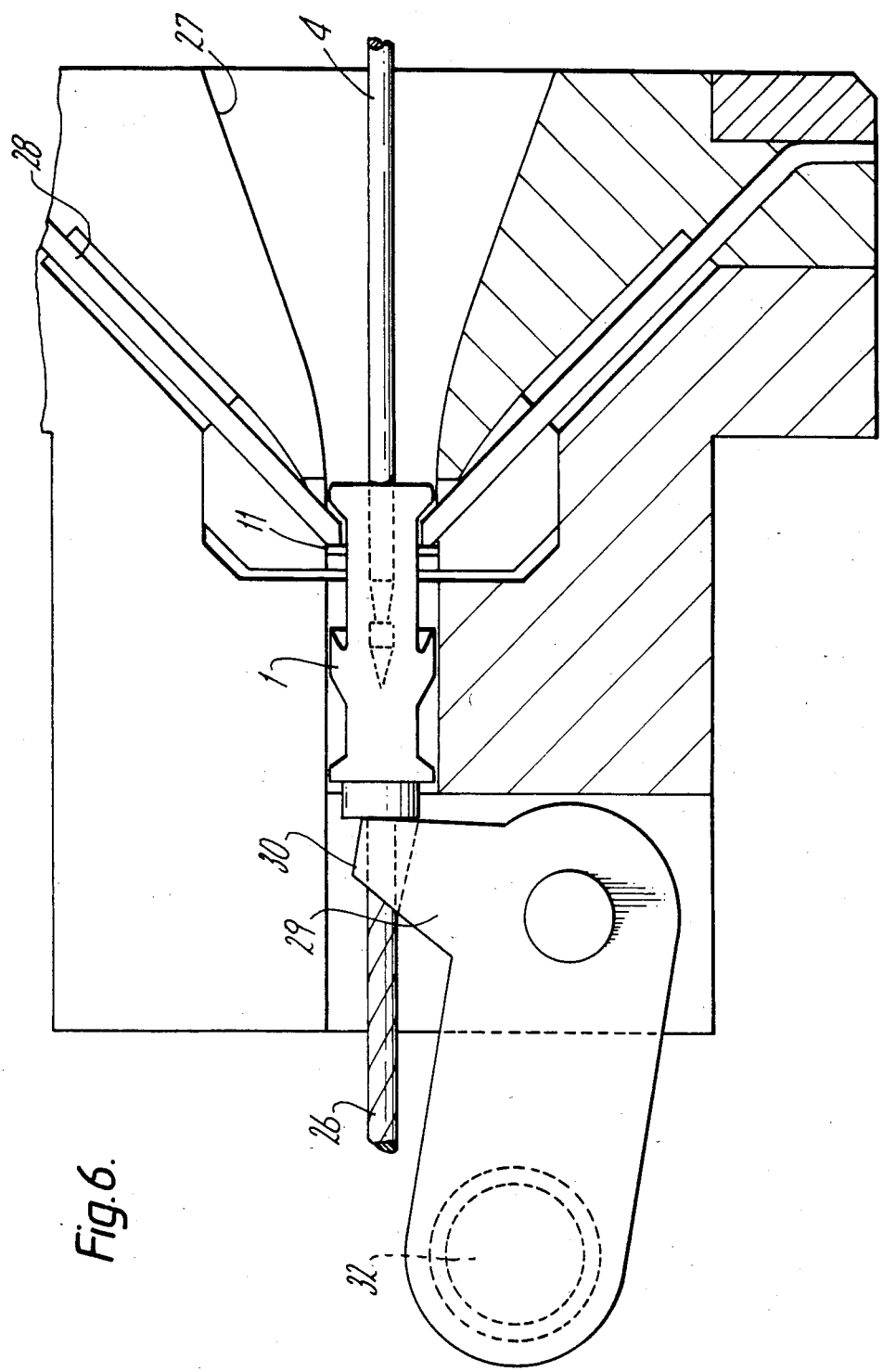
FIG. 6 is a view, partly in section, corresponding to that of FIG. 5, but on a larger scale.

As shown in FIG. 3 a snood head 1 with entered hook leg 4 and with snood 26 placed in the cavity 21 with the snood end of the head in engagement with the cock point 30, and the housing 20 is by means of the springs 23 pressed to its end position on the slide guide 24. In this position of the housing 21 the caster 32 engages the front end of the cam 33. The hook leg 4 is locked by means of the U spring 8, as shown in FIG. 1a. Hereby, and as shown in FIG. 4, at least two of the wire springs 28 will extend underneath the projection 11 on the U-shaped spring 8.

For the release of the hook 4, a pull is exerted to the left in the snood 26. When this pull exceeds the force of the springs 23, the housing 20 with the snood head 1 is pulled to the left, the caster 32 will be moved upwardly along the face of the cam 33 and the cock point 30 will be rotated to the position shown in FIG. 5, which means that the snood head 1 is displaced to the right relatively to the housing 20. Hereby, the wire springs 29 will abut against the projections 11 so that the U spring 8 will be locked relatively to the housing 20 while the head 1 is moved to the right. Consequently, the bent ends 9 of the U spring 8 slide along the oblique surfaces 7 in the head and is thereby forced to spread so that the engagement with the annular surface 12 on the hook leg 4 is released, as shown in FIG. 1c, and the hook 4 may be pulled outwardly to the right in FIG. 5.

Figure 7:
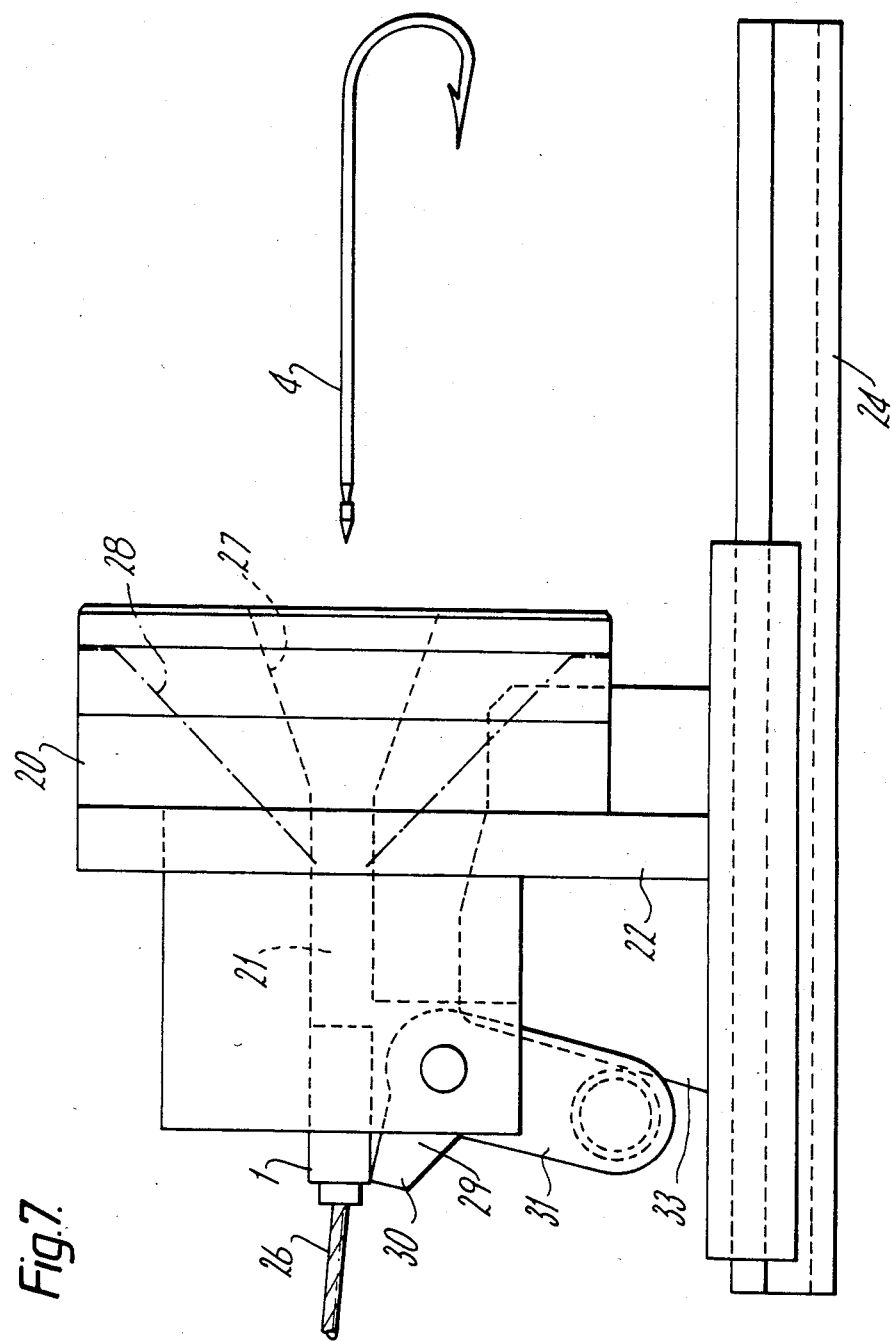
FIG. 7 is a side view, corresponding to those of FIGS. 3 and 5, after the release of the fish hook.

When further pull is applied to the snood 26, the head 1 pushes the cock 29 over into the position shown in FIG. 7 with the caster 32 carried downwardly along an approximately vertical edge of the cam 33. Hereby the cock is rotated out of the cavity 21 so that the head 1 may be pulled out of the apparatus. The springs 23 will no longer be subjected to a pull in the snood 26 and will, consequently, carry the housing 20 back to its initial position, FIG. 3.

I claim:

1. An apparatus for the release of a fish hook from an elongated snood head of the type which has a transversely-extending opening and which includes a substantially U-shaped leaf spring that is movable in the opening in the longitudinal direction of the snood head, the substantially U-shaped spring having branches which are adapted to cooperate with an annular face on the leg of a fish hood and, in part, to be spread apart when each cooperates with an oblique surface in the transversely-extending opening for the purpose of releasing the engagement between the hook leg and the leaf spring; the apparatus comprising a movable housing having a longitudinal cavity that has a cross section that corresponds to the cross section of said snood head and a conical entry portion, a plurality of wire springs which extend obliquely towards said cavity, said wire springs having inner ends which extend into said cavity and through the transversely-extending opening in said snood head and capable of abutting said substantially U-shaped leaf spring, a cock which is pivotally mounted to said housing, said cock having a point portion which extends into said cavity and a caster, and a stationary cam along which said caster of said cock moves when said housing is moved in parallel with the longitudinal cavity therein, the pivotal movement of said cock due to its caster moving over said cam causing said snood head to move relative to said substantially U-shaped leaf spring to spread each of its branches along the oblique surface in said opening to release the engagement between said hook leg and said leaf spring.

2. An apparatus as defined in claim 1, including a slide guide which movably mounts said housing, said slide guide extending in parallel with said longitudinal cavity in said housing.

3. An apparatus as defined in claim 1, wherein said point section of said cock is slotted.

* * * * *